Figure 1:
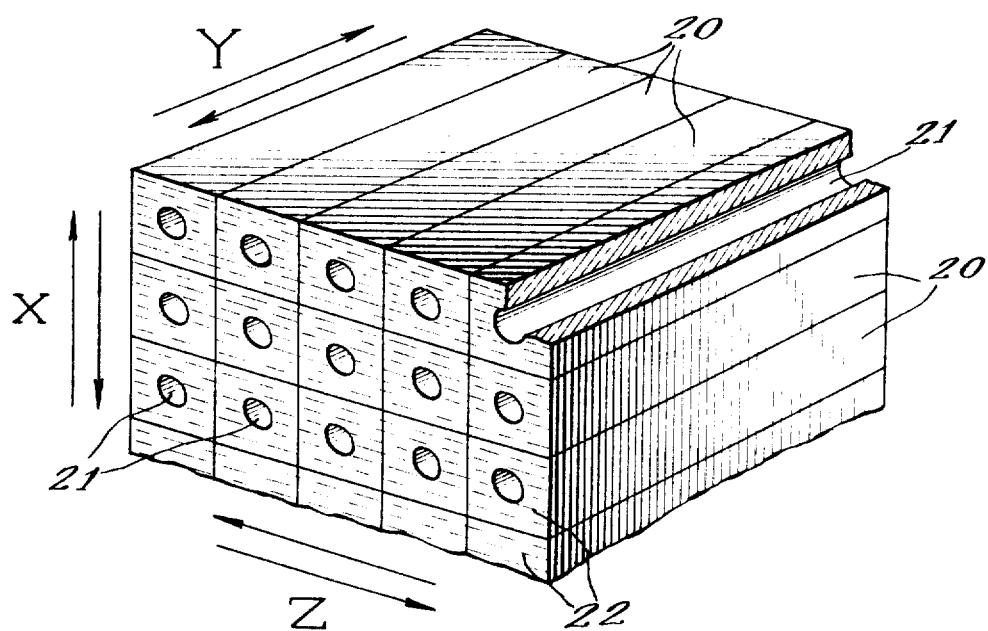

Aug. 23, 1966   L. H. JUEL ETAL   3,268,385
CARBON ELECTRODES OR NEUTRONIC REACTOR CORE BARS
Filed Feb. 9, 1961

Inventors:
Leslie H Juel
Bruce L Bailey

United States Patent Office 3,268,385
Patented August 23, 1966

3,268,385
CARBON ELECTRODES OR NEUTRONIC REACTOR CORE BARS
Leslie H. Juel and Bruce L. Bailey, Lewiston, N.Y., assignors to Great Lakes Carbon Corporation, a corporation of Delaware
Filed Feb. 9, 1961, Ser. No. 88,064
4 Claims. (Cl. 161—177)

This invention relates to a special type of carbonaceous electrode or core material bar for atomic reactors, said bars, when graphitized, and properly placed in a neutronic reactor core providing maximum stability and minimum susceptibility to high temperature radiation damage.

The rods or bars of the present invention, which will generally be substantially rectangular in cross section, are used to perform the function of rods or blocks such as those shown and depicted by the number 77 in FIGURE 22 of the Fermi et al. Patent 2,708,656.

In the design of the reactors of this patent, and of similar reactors, the problem is encountered wherein excessive shrinkage vertically across a series of blocks 77 resulting from high temperature radiation damage, causes a downward slumping of the whole reactor core assembly thereby preventing certain mechanical operations essential to the proper functioning of the reactor and necessitating relatively frequent reconstruction or repair thereof. Radiation effects or damage horizontally across a series of blocks 77, or along the length of blocks 77, do not occasion as serious problems. Thus, it is advantageous if the blocks 77, can be so constructed that they will have a controllable and predictable response to high temperature radiation damage with a minimal shrinkage in the one critical direction (the vertical direction in this instance). This result obtains when the highly anisotropic graphite crystallites in the bars or blocks are mutually oriented in a manner approaching that characteristic of a single crystal of natural or flake graphite. Such bars under exposure to high temperature radiation would suffer minimal shrinkage in the direction perpendicular to the planes of the graphite crystallites. By controlling the internal orientation of these graphite crystallites or coke or carbonaceous particles employed in the manufacture of these rods and combining this with proper placement of such internally oriented rods in the reactor, after said rods or blocks have been graphitized, the deleterious radiation effects from the uranium rods 75 are disspelled horizontally across a series of such rods or in a direction along the length of the rods rather than vertically, thereby minimizing downward slumping. The susceptibility of these core material bars to high temperature radiation damage in the one critical direction is thereby very greatly minimized with the result that the frequentness of reconstruction or repair of the reactor is greatly lessened.

This invention is based upon the discovery and control of those conditions effectuating the best internal structure of such rods, best reactor placement of such rods, the formulation and processing for bringing about such controlled orientation and placement, and also upon the discovery, design and construction of special extrusion apparatus which mechanically assists in bringing about this orientation. The foregoing developments have led to the development and reduction to practice of the novel extruded (green, baked or graphitized) carbonaceous products of the present invention. These developments also comprise the subject matter of co-pending patent applications Ser. No. 88,067, filed February 9, 1961 by L. H. Juel (now United States Patent 3,168,509) and Ser. No. 337,970 filed December 27, 1963 by L. H. Juel and B. L. Bailey, which latter application is a divisional of the present application.

We have found that the core material rods best suited for use in neutronic reactors and as depicted in FIGURE 1 should essentially be comprised, when in their extruded "green" state, of carbonaceous particles in substantially platelet form, wherein said platelets, when extruded in the apparatuses described in said co-pending applications, form lamellae lengthwise of the rod. These lamellae are disposed in a plurality of superimposed planes a high percentage of which planes are substantially mutually parallel. This preferential orientation or alignment of the lamellae or platelets obtains in a "green" extruded bar, when after baking and graphitizing said "green" bar, the physical properties, e.g., Coefficient of Thermal Expansion, Resistivity, etc. measured along three mutually perpendicular axes corresponding to the two edges and length of a bar of rectangular cross section exhibit approximately the same type of anisotropy characteristic of a single crystal of graphite. In other words, the magnitude of any given property measured along the axes of extrusion and in one direction, e.g., along the width perpendicular to the extrusion axis, will be substantially different from the magnitude of that same property measured in the direction (i.e., along the heighth) mutually perpendicular to the other two axes. These effects and their meaning will be made clearer by reference to the examples which follow.

We have also found that all of the rods in the neutronic reactor should be so placed that these lamellar planes are substantially horizontal throughout the entire reactor. This can be better understood by referring to FIGURE 1 wherein a perspective view of a portion of a typical neutronic reactor is shown and wherein bars or rods 20 in their extruded "green," viz. formed, but unbaked condition having lamellae 22 disposed in a plurality of superimposed parallel planes are shown, and also wherein all of the rods of the reactor are properly placed with respect to each other. The cylindrically shaped holes 21 are centrally located within each of the rods or bars of this invention to accommodate fuel elements. (It is to be understood that the rods will be graphitized before their placement in the reactor with the "green" state orientation above described for illustrative purposes preserved.) When these conditions prevail, the CTE (coefficient of thermal expansion) and resistivity of the rods when graphitized are considerably greater in the X direction than they are in the Y or Z directions. This results in the minimization of radiation damage in the X direction and the substantial reduction of downward slumping caused thereby when such graphitized rods or bars are used in the reactors. As previously stated, the elimination or minimization of damage caused in the horizontal or Z direction, or lengthwise of the rods or in the Y direction, is not nearly so critical to the proper continued functioning of the reactor as is the minimization of damage in the vertical or X direction. This is because the base of the reactor remains substantially firm and mechanically sound even with damage in these directions, whereas slumping in the X direction soon creates mechanical inoperability and damage throughout the entire reactor.

We have also discovered extrusion apparatus which is ideally equipped or constructed to bring about the production of such bars or rods having the orientation properties described (and illustrated in FIG. 1, previously discussed), such apparatus and modifications thereof being shown in FIGURES 1 through 4 of our divisional application Ser. No. 337,970, filed December 27, 1963.

The shear forces exerted upon and set up in the extrudable mixture (by the apparatus described in our co-pending application) as it passes through the transition section and as it is compressed in passing between the converging and parallel walls of the final forming or third section act together to form the novel extruded, "green," substantially rectangular cross-sectioned carbon rods of the present invention, wherein the platelet-like particles of the carbonaceous mixture in their extruded condition align to comprise lamellae, sometimes somewhat discontinuous in nature and at other times very nearly continuous, disposed in a plurality of superimposed planes a high percentage of which said lamellar planes are substantially mutually parallel.

Conventional extrusion techniques for making electrodes generally comprise passing a pitch-carbonaceous mixture from a mud chamber through a cylindrical extrusion die. The cylindrical rods fabricated by such equipment are of course entirely unsuitable for use in nuclear reactors in the manner discussed previously. Not only do they not possess the proper geometrical cross-section, but also, even if a substantially square or rectangular cross-sectioned product were fashioned from such cylindrically shaped starting pieces, such as by machining off four arcs from the outer periphery, such a product would not possess the orientation properties required to minimize susceptibility to radiation damage in nuclear reactors. This is because the platelet like particles would tend to align themselves in concentric ring fashion lengthwise of the products. Not only would such products lack the desired orientation but even if they possessed same, they would be unduly expensive and impractical because of the amount of machining that would be necessary to transform them into substantially square or rectangular cross-sectioned products and also because of loss of materials involved.

Direct extrusion into products such as rods or slabs which are square or rectangular in cross section by means of conventional extrusion devices, not having the characteristics of the apparatus described in our co-pending applications, also result in rods lacking the desired orientation. This is primarily because such devices are not characterized by a die having two substantially parallel walls, which type die is common to the apparatus of both of our other applications, but instead utilize dies having two pair of converging opposite walls. Such devices also lack transition sections such as characterized in application Ser. No. 337,970. All of these factors prevent the obtainment of the desired preferential orientation such as is achieved in the carbonaceous bodies of this invention.

The following examples are set forth in order to more fully describe the invention.

*Example 1*

An extrudable carbonaceous mass was prepared from a mixture of approximately 37 parts of coal tar pitch binder and 100 parts of "needle" coke such as shown in U.S. Patent 2,775,549. The particles of needle coke were of such a size that at least 55% passed through a 200 mesh screen and substantially all passed through a 20 mesh screen. This extrudable mixture was mixed at a temperature of approximately 160° C., cooled to approximately 100° C. and then extruded through the apparatus shown in FIGURES 1-3 of our co-pending application Ser. No. 337,970. The platelet like carbonaceous particles of this mixture after their passage through the apparatus were orientated in lamellae disposed in a plurality of superimposed planes a high percentage of which planes were substantially mutually parallel and approximately perpendicular to the substantially parallel walls of the third or final forming section. The ratio of the height of the inlet of this final forming section to the height of the outlet of said section was about 2 to 1. In other words, the smaller dimension of the extrudable mass changed by this amount while the larger dimension remained substantially constant. The extruded green carbon product was substantially rectangular in cross-section and possessed the platelet orientation previously described. This "green" carbon product was baked and graphitized in accordance with conventional techniques and was then, except for lengthwise cutting and final machining and boring, ready for placement and use in neutronic reactors also as previously described.

*Example 2*

The procedure of Example 1 was repeated using the same apparatus as in Example 1 and employing approximately 40 parts of pitch binder and 100 parts of "needle" coke of such a particle size that at least 55% passed through a 200 mesh screen and substantially all passed through a 20 mesh screen. The "green" carbon product produced, when baked and graphitized, possessed a CTE ($1/°C. \times 10^7$) of 12.8 in the Z direction, 39.4 in the X direction and 10.7 in the Y direction, as these directions are indicated in FIGURE 1. It can be seen from this that the magnitude of the CTE along the axis of extrusion and along the width perpendicular to the extrusion axis are substantially different from the magnitude of the CTE measured along the X direction or the height of the rod, which is mutually perpendicular to the other two directions. The resistivity (ohm/in.$^3 \times 10^5$) of this product was 34 in the Z direction, 65 in the X direction and 29 in the Y direction.

*Example 3*

The procedure of Example 1 was repeated employing approximately 43 parts of pitch binder and 100 parts of "needle" coke of such a size that at least 55% passed through a 200 mesh screen and substantially all passed through a 20 mesh screen. The mixture was extruded through the cylindrical extrusion chamber and transition sections of FIGURES 1-3 but using the modified die shown in FIGURE 4 of our co-pending application. The "green" carbon product produced when baked and graphitized possessed a CTE in the Z direction of 16.2, a CTE of 53.5 in the X direction and a CTE of 11.2 in the Y direction. The resistivity of this product was 33 in the Z direction, 83 in the X direction and 33 in the Y direction.

The desired preferential orientation obtained in the foregoing examples is not achieved, nor is it achievable when using a standard type of extrusion apparatus.

It will be appreciated from the foregoing description and examples that a wide variation in the processing conditions, starting materials and apparatus features are possible and contemplated when carrying out the practices of this invention, or the practices of the invention of our co-pending application. For example, resins or suitable hydrocarbon binders may be employed as well as pitch. The amount of binder employed and the particle sizes and types of starting carbonaceous platelets may all be varied. Carbonaceous particles in substantially platelet form such as finely ground (preferably all at least finer than 20 mesh) "needle" coke shown in U.S. Patent 2,775,549, decomposed silicon carbide, natural graphite and kish and mixtures thereof are among those which may be employed as starting carbonaceous materials and mixed with a binder such as pitch and processed and extruded through the devices of the present invention to form products having the desired properties. The amount of pitch used when it is employed as a binder will generally vary from about 30 to about 45 parts by weight per 100 parts of carbonaceous material. The temperatures and pressures employed may be varied. The use of a cylindrical extrusion chamber is optional and if it is used, it may have a variable length. The transition section may vary in its angle of slope and in its length as well as in other manners previously described. The size of the inlet of the final forming section may be varied greatly and the ratio of the dimension of the inlet of the final forming section which is compressed to its reduced dimension at the outlet may vary considerably, such as from about 2:1 to 5:1 with suitable modification in the contour of the final forming section. The employment of one or more vanes in conjunction with all of the foregoing variables and the possible varied locations of same all taken together make it possible to form products having the desired characteristics previously described and are contemplated as being embraced in the present invention.

These variations, the selection of the desired starting materials, equipment employed (all of which variations however are within the scope of the claims of our other copending applications) etc., are considered within the skill of one working in the art once the main features of this invention and the inventions of our other applications are before him. We therefore do not wish to be limited except as defined by the appended claims.

We claim:

1. An extruded green, rectangular cross-sectioned carbon body formed from a mixture of binder and carbonaceous particles in substantially platelet form, wherein said platelets in their extruded condition comprise lamellae disposed in a plurality of superimposed planes, a high percentage of which said planes being substantially mutually parallel, and wherein said green carbon body, when baked and graphitized, is characterized by having a coefficient of thermal expansion in the plane perpendicular to the planes of the crystallites or the X direction, at least twice as great as it is in each of the planes mutually perpendicular to the X plane and to each other, or in the Y and Z directions.

2. An extruded body according to claim 1 wherein said body contains 100 parts by weight of said carbonaceous particles, at least 55% of which pass through a 200 mesh screen and substantialy 100% of which pass through a 20 mesh screen, and from about 30 to about 45 parts by weight of pitch.

3. The body of claim 1 when baked.

4. An extruded, graphitized, rectangular cross-sectioned carbonaceous body formed from a mixture of binder and carbonaceous particles in substantially platelet form, wherein said platelets in their extruded condition comprise lamellae disposed in a plurality of superimposed planes, a high percentage of which said planes are substantially mutually parallel, and wherein said body in the graphitized state is characterized by having a coefficient of thermal expansion in the plane perpendicular to the planes of the crystallites or the X direction, at least twice as great as it is in each of the planes mutually perpendicular to the X plane and to each other, or in the Y and Z directions.

References Cited by the Examiner
UNITED STATES PATENTS

| | | | |
|---|---|---|---|
| 2,572,677 | 10/1951 | Tench | 18—12 |
| 2,612,655 | 10/1952 | Mathues | 18—12 |
| 2,708,656 | 5/1955 | Fermi et al. | 204—193.2 |
| 2,775,549 | 12/1956 | Shea | 208—52 |
| 2,852,457 | 9/1958 | Long et al. | 204—193.2 |
| 2,864,759 | 12/1958 | Long et al. | 204—193.2 |
| 3,001,238 | 9/1961 | Goeddel et al. | 106—56 |
| 3,097,151 | 7/1963 | Martin | 106—56 |

EARL M. BERGERT, *Primary Examiner.*

WILLIAM J. STEPHENSON, *Examiner.*

H. F. EPSTEIN, W. E. THOMPSON,
*Assistant Examiners.*